United States Patent
Dessy et al.

(10) Patent No.: US 10,212,421 B2
(45) Date of Patent: Feb. 19, 2019

(54) METHOD AND DEVICE FOR DIGITAL DATA COMPRESSION WITH SIGN BIT REMOVAL

(71) Applicant: intoPIX s.a., Mont-Saint-Guibert (BE)

(72) Inventors: Valentin Dessy, Fleurus (BE); Pascal Hubert Pellegrin, Wierde (BE); Thomas Denison, Gembloux (BE); Charles Daniel Buysschaert, Brussels (BE); Gael Rouvroy, Woluwe-Saint-Pierre (BE); Gauthier Crucifix, Libramont-Chevigny (BE); Tanguy Gilmont, Court-Saint-Etienne (BE)

(73) Assignee: intoPIX s.a., Mont-Saint-Guibert (BE)

( * ) Notice: Subject to any disclaimer, the term of this patent is extended or adjusted under 35 U.S.C. 154(b) by 206 days.

(21) Appl. No.: 15/394,879

(22) Filed: Dec. 30, 2016

(65) Prior Publication Data

US 2018/0192051 A1    Jul. 5, 2018

(51) Int. Cl.
*G06K 9/36* (2006.01)
*H04N 19/124* (2014.01)
(Continued)

(52) U.S. Cl.
CPC ........... *H04N 19/124* (2014.11); *H04N 19/12* (2014.11); *H04N 19/132* (2014.11); *H04N 19/137* (2014.11); *H04N 19/146* (2014.11); *H04N 19/18* (2014.11); *H04N 19/184* (2014.11); *H04N 19/423* (2014.11);
(Continued)

(58) Field of Classification Search
CPC ...... H04N 19/91; H04N 19/635; H04N 19/12; H04N 19/124; H04N 19/132; H04N 19/137; H04N 19/146; H04N 19/18; H04N 19/184; H04N 19/423; H04N 19/44; H04N 19/645
See application file for complete search history.

(56) References Cited

U.S. PATENT DOCUMENTS

| | | | |
|---|---|---|---|
| 6,549,666 B1 * | 4/2003 | Schwartz | G06F 17/148 375/E7.016 |
| 2010/0141328 A1 * | 6/2010 | Meninger | H03L 7/0812 327/512 |

(Continued)

FOREIGN PATENT DOCUMENTS

| EP | 2773122 A1 | 9/2013 |
|---|---|---|
| WO | 2010091930 A2 | 8/2010 |

*Primary Examiner* — Obafemi O Sosanya
(74) *Attorney, Agent, or Firm* — Christopher Casieri (57) ABSTRACT

The invention provides a method and device for compressing a sequence of signed coefficients wherein coefficients are grouped, for each group, the greatest coded line index (GCLI) is determined, a quantization level t is applied and only the GCLI-t lowest weight bits of the coefficients are copied into the output stream together with the value of the GCLI. According to the invention, sign bits are not coded for coefficient having a zero quantized value. The invention also provides a method for determining a data budget required for compressing a sequence of signed coefficients, in dependence of a quantization level, and a method for compressing an image within the limits of a given data budget constraint. The invention provides a compressed data set coding an image in an efficient way.

19 Claims, 8 Drawing Sheets

(51) Int. Cl.
*H04N 19/132* (2014.01)
*H04N 19/146* (2014.01)
*H04N 19/18* (2014.01)
*H04N 19/184* (2014.01)
*H04N 19/645* (2014.01)
*H04N 19/12* (2014.01)
*H04N 19/137* (2014.01)
*H04N 19/423* (2014.01)
*H04N 19/44* (2014.01)
*H04N 19/91* (2014.01)

(52) U.S. Cl.
CPC ........... *H04N 19/44* (2014.11); *H04N 19/645* (2014.11); *H04N 19/91* (2014.11)

(56) References Cited

U.S. PATENT DOCUMENTS

| | | | |
|---|---|---|---|
| 2014/0247999 A1* | 9/2014 | Pellegrin | H04N 19/91 382/232 |
| 2016/0056905 A1* | 2/2016 | Hartlmueller | H04L 12/40032 375/354 |

\* cited by examiner

Table 1 : example of input data coefficients

| bits | | coefficients | | | | | | | | | | | | |
|---|---|---|---|---|---|---|---|---|---|---|---|---|---|---|
| | | 3 | 250 | 138 | 179 | 53 | 12 | 14 | 26 | 220 | 0 | 68 | 92 | |
| | sign | 0 | 1 | 1 | 1 | 0 | 0 | 0 | 0 | 1 | 0 | 1 | 0 | |
| MSB | 15 | 0 | 0 | 0 | 0 | 0 | 0 | 0 | 0 | 0 | 0 | 0 | 0 | |
| | 14 | 0 | 0 | 0 | 0 | 0 | 0 | 0 | 0 | 0 | 0 | 0 | 0 | |
| | 13 | 0 | 0 | 0 | 0 | 0 | 0 | 0 | 0 | 0 | 0 | 0 | 0 | |
| | 12 | 0 | 0 | 0 | 0 | 0 | 0 | 0 | 0 | 0 | 0 | 0 | 0 | |
| | 11 | 0 | 0 | 0 | 0 | 0 | 0 | 0 | 0 | 1 | 0 | 0 | 0 | |
| | 10 | 0 | 0 | 0 | 0 | 0 | 0 | 0 | 0 | 1 | 0 | 1 | 1 | |
| | 9 | 0 | 0 | 0 | 0 | 0 | 0 | 0 | 0 | 0 | 0 | 0 | 0 | |
| | 8 | 0 | 1 | 1 | 1 | 0 | 0 | 0 | 0 | 1 | 0 | 0 | 1 | |
| | 7 | 0 | 1 | 0 | 0 | 0 | 0 | 0 | 0 | 1 | 0 | 0 | 1 | |
| | 6 | 0 | 1 | 0 | 1 | 1 | 0 | 0 | 0 | 1 | 0 | 1 | 1 | |
| | 5 | 0 | 1 | 0 | 1 | 1 | 0 | 0 | 1 | 0 | 0 | 0 | 0 | |
| | 4 | 0 | 1 | 1 | 0 | 0 | 1 | 1 | 1 | 0 | 0 | 0 | 0 | ↑ |
| | 3 | 0 | 0 | 0 | 0 | 1 | 1 | 1 | 0 | 0 | 0 | 0 | 0 | quantization |
| | 2 | 1 | 1 | 1 | 1 | 0 | 0 | 1 | 1 | 0 | 0 | 0 | 0 | level |
| LSB | 1 | 1 | 0 | 0 | 1 | 1 | 0 | 0 | 0 | 0 | 0 | 0 | 0 | |
| | GCLI | 8 | | | | 7 | | | | 8 | | | | |
| | GAIN | 0 | | | | 0 | | | | 3 | | | | |

FIG.5

Table 2 : example of input data coefficients after quantization

| 0 | 1 | 1 | 1 | 0 | 0 | 0 | 0 | 1 | 0 | 1 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 |
| 0 | 0 | 0 | 0 | 0 | 0 | 0 | 0 | 1 | 0 | 1 | 1 |
| 0 | 0 | 0 | 0 | 0 | 0 | 0 | 0 | 0 | 0 | 0 | 0 |
| 0 | 1 | 1 | 1 | 0 | 0 | 0 | 0 | 1 | 0 | 0 | 1 |
| 0 | 1 | 0 | 0 | 0 | 0 | 0 | 0 | 1 | 0 | 0 | 1 |
| 0 | 1 | 0 | 1 | 1 | 0 | 0 | 0 | 1 | 0 | 1 | 1 |
| 0 | 1 | 0 | 1 | 1 | 0 | 0 | 1 | 0 | 0 | 0 | 0 |

FIG.6

Table 3 : example of sign and magnitude data packing

FIG.7

Table 4 : example of data budget determination

FIG.8

METHOD AND DEVICE FOR DIGITAL DATA COMPRESSION WITH SIGN BIT REMOVAL

FIELD OF THE INVENTION

The invention relates to a method for compressing an input data set comprising a sequence of signed coefficients into an output data set and and to a method for decompressing said output data set. The invention also relates to a compressed data set and to a device for performing this compression method and a device for performing said decompression method. The invention also relates to a method for determining a data budget required for compressing a subset of coefficients of an input data set in dependence of a quantization level t to be applied to all coefficients of said subset, and to a method for compressing an image, meeting a data budget constraint. The invention may be applicable to image or video data.

DESCRIPTION OF PRIOR ART

Image compression is required when one needs to transmit or store images that would require a larger bitrate than the available bandwidth of the communication channel or the capacity of the storage medium. This is possible when the images contain a significant amount of redundancy, and some amount of details that are imperceptible to the human eye, or at least that could be removed without compromising the purpose of the transmission. The compression is said to be lossless when the images are not modified by the compression-decompression cycle, and thus are identical at the emitter and the receiver. However, it is usually not possible to guarantee a lossless compression since it depends on the intrinsic characteristics of the images, in which the redundancy and the ability to remove it by a clever encoding alone may not always succeed in reducing the bitrate enough. In such case, a lossy compression scheme is required, and the encoder reduces the information contained in the images by quantization, in order to guarantee a required output bitrate at the expense of quality. The rate allocation calculates, for all the values, the levels of quantization that maximize the quality under a bitrate constraint.
The process of encoding the resulting data and all the information necessary to the decoder is performed by the entropy encoder.

Document U.S. Pat. No. 6,778,709B1 describes an entropy encoder that processes codeblocks of fixed size, typically 64×64 or 32×32 coefficients of a decorrelative wavelet transform (DWT). It compresses the codeblocks in multiple passes of significance, then magnitude from the MSB to the LSB, and renormalization. It only encodes the sign of each coefficient once a non-zero bit is present, thus skipping sign bits for null coefficients. Each additional pass produces an amount of compressed bits and an estimated reduction of distortion. Those values are used by the rate allocation to select the optimal point on the rate-distortion curve, under the constraints of meeting the required rate and minimizing the distortion. One limitation in this document is determining the data budget, which can only be done by running all the passes on all the codeblocks in the entropy encoder, and storing the entire result, before allowing the rate allocation to select the relevant passes. Another limitation in this document is the complexity of the arithmetic encoder, and the consequent number of operations it must perform to run all the passes on a codeblock, which varies with its content and whose maximum gets very high when the entropy of the image increases. In a software or hardware device implementing this method, it is necessary to run many entropy encoders in parallel in order to achieve typical video resolutions and framerates. This has a huge impact on logic gate count, buffering and power consumption.

Document U.S. Pat. No. 9,332,258B2, the contents of which are incorporated by reference in its entirety, describes a similar entropy encoding method for sign-magnitude-encoded coefficients used in compression. In this method all the signs of the coefficients are packed in the output data set. This method does not provide a way to pre-calculate data budget.

SUMMARY OF THE INVENTION

It is an object of the present invention to solve the above mentioned problems. In particular, it is an object of the present invention to provide a compression and decompression method and device having a low complexity, allowing data budget reduction by suppression of sign bits for null coefficients, and allowing a precalculation of the data budget in function of a quantization level. It is also an object of the invention to provide a compressed data set having a reduced data budget.

The invention is defined by the independent claims. The dependent claims define advantageous embodiments.

According to a first aspect of the invention, there is provided a method for compressing an input data set comprising a sequence of M coefficients, each coefficient having m bits coding a magnitude and a sign bit, into an output data set comprising a magnitude output data set, a sign output data set and a meta-data output data set, comprising the steps of:

a) grouping the resulting decorrelated coefficients into one or more successive groups of n coefficients, n being greater than or equal to 2, each group of coefficients having a sign bit plane and m magnitude bit planes for the different weights of the coefficients;

b) for each group i of coefficients, associating a gain factor $gain_i$, the gain factor $gain_i$ of a group being a left shift of zero to m bits of the coefficients of said group;

c) for each group i of coefficients, determining a value of the Greatest Coded Line Index (GCLI), the $GCLI_i$ being the index of the highest weight non-zero bit among the bits, excluding any sign bit, of the words in said group i, the index being counted from 1 for the least significant bit to m for the most significant bit, the GCLI being zero for a group wherein all of the coefficients are equal to zero;

d) determining a quantization level t, a quantization level t being the number of least significant bits that may be removed from each of said coefficients of said input data set;

e) for each group i of coefficients:
for each coefficient in said group
applying a left-shift of $gain_i$ bits and a right shift of t bits to said coefficient;
if the resulting value is smaller than 1, doing nothing;
if the resulting value is greater than or equal to 1, copying the sign bit of said coefficient to the sign output data set;

f) for each group i of coefficients:
if $GCLI_i + gain_i \geq t+1$, for each bit plane of said group, starting from the bit plane having index $GCLI_i + gain_i$, to the bit plane having index t+1, copy said bit plane to the magnitude output data set; if $GCLI_i + gain_i < t+1$, doing nothing;

g) for each group i of coefficients, determining the number of bit planes copied, $I_i$, being equal to max($GCLI_i$+$gain_i$−t,0), and copying the value of $I_i$ to said meta-data output set;

h) for each group i of coefficients, providing data representing said gain $gain_i$ to said meta-data output set;

i) providing data representing said quantization level t to said output data set.

The input data set may be a display image comprising rows and columns of pixels, a block of such an image divided in blocks, a subband resulting from a decorrelative transform of such an image or a sequence of coefficients representing a precinct grouping frequency contents of different subbands forming a same spatial area of a display image. The gain factors $gain_i$ may be determined according to the need of the application. For example, an application may be done without using gains, in which case the data representing the gain factors in the output data set are void. In another example, a gain may be attributed according to the subband contained in the input data set.

Preferably, said input data set is obtained by performing a decorrelative transform on a non-decorrelated input data set.

Preferably, said de-correlative transform is a DWT 5/3 wavelet transform based on a filter bank.

Preferably, said sequence of M coefficients corresponds to a sequence of pixels in one or more rows of a display image comprising rows and columns of pixels and that said de-correlative transform is performed on said sequence of pixels in one or more rows.

Preferably, said sequence of M coefficients corresponds to a sequence of coefficients grouping frequency contents of different subbands forming a same spatial area of a display image comprising rows and columns of pixels.

Preferably, n is smaller than or equal to 8.

Preferably, said n is equal to 4.

Said step (g) may advantageously comprises the step of replacing the $I_i$'s by an entropic coding thereof. More advantageously, said entropic coding is a unary coding. This further reduces the size of the output data set.

According to a second aspect of the invention, there is provided a method for decompressing an input data set comprising a meta-data input set comprising a sequence of values of $I_i$ being a number of bit planes and data representing a sequence of gain factors $gain_i$ and a magnitude input data set comprising a sequence of groups of h bit planes having each n bits, associated with said sequence of values of $I_i$, and with said sequence of gain factors $gain_i$, and a sign input data set comprising a sequence of sign bits, said input data set being obtainable by the method of claim 1, into an output data set, said output data set comprising a sequence of M coefficients, each coefficient having m bits coding a magnitude and a sign bit, comprising the step of:

for all successive said $I_i$ values,
If $I_i \geq 1$,
i. computing $GCLI_i = I_i + t - gain_i$;
ii. copying successive h n-bit bit planes from said magnitude data input set to bit planes of index $GCLI_i$ to $t - gain_i + 1$ of successive groups of n m-bit words of said output data set;
iii. for each n m-bit word of said group:
if said m-bit word has a magnitude different from zero copying a successive sign bit from said sequence of sign bits to the sign bit of said m-bit word;
if said m-bit word has a magnitude equal to zero copying a zero bit to the sign bit of said m-bit word.

If $I_i = 0$, do nothing.

According to a third aspect of the invention, there is provided a compressed data set corresponding to an uncompressed data set, said uncompressed data set comprising a sequence of M coefficients, each coefficient having m bits coding a magnitude and a sign bit, said compressed data set comprising a data set comprising a magnitude data set comprising a sequence of magnitude data, each magnitude data comprising a number $I_i$ of bit planes, each bit plane having n bits, and a sign data set comprising a sequence of sign bits; and a meta-data set comprising a sequence of values of $I_i$ and data representing a sequence of gain factors $gain_i$, said two sequences being associated with said sequence of magnitude data, obtainable by the method of claim 1.

The compressed data set may correspond to an uncompressed data set, representing a display image comprising rows and columns of pixels.

According to a fourth aspect of the invention, there is provided a device for compressing an input data set comprising a sequence of M coefficients, each coefficient having m bits coding a magnitude and a sign bit, into an output data set comprising a magnitude output data set, a sign output data set and a meta-data output data set, comprising at least one of a logic circuit, an ASIC, a FPGA and a CPU, configured for performing the steps of:

a) grouping the resulting decorrelated coefficients into one or more successive groups of n coefficients, n being greater than or equal to 2, each group of coefficients having a sign bit plane and m magnitude bit planes for the different weights of the coefficients;

b) for each group i of coefficients, associating a gain factor $gain_i$, the gain factor $gain_i$ of a group being a left shift of zero to m bits of the coefficients of said group;

c) for each group i of coefficients, determining a value of the Greatest Coded Line Index (GCLI), the $GCLI_i$ being the index of the highest weight non-zero bit among the bits, excluding any sign bit, of the words in said group i, the index being counted from 1 for the least significant bit to m for the most significant bit, the GCLI being zero for a group wherein all of the coefficients are equal to zero;

d) determining a quantization level t, a quantization level t being the number of least significant bits that may be removed from each of said coefficients of said input data set;

e) for each group i of coefficients:
for each coefficient in said group
applying a left-shift of $gain_i$ bits and a right shift of t bits to said coefficient;
if the resulting value is smaller than 1, doing nothing;
if the resulting value is greater than or equal to 1, copying the sign bit of said coefficient to the sign output data set;

f) for each group i of coefficients:
if $GCLI_i + gain_i \geq t+1$, for each bit plane of said group, starting from the bit plane having index $GCLI_i + gain_i$, to the bit plane having index t+1, copy said bit plane to the magnitude output data set;
if $GCLI_i + gain_i < t+1$, doing nothing;

g) for each group i of coefficients, determining the number of bit planes copied, $I_i$, being equal to $\max(GCLI_i+gain_i-t,0)$, and copying the value of $I_i$ to said meta-data output set;

h) for each group i of coefficients, providing data representing said gain $gain_i$ to said meta-data output set;

i) providing data representing said quantization level t to said output data set According to a fifth aspect of the invention, there is provided a device for decompressing an input data set comprising a meta-data input set comprising a sequence of values of $I_i$ being a number of bit planes and data representing a sequence of gain factors $gain_i$, and a magnitude input data set comprising a sequence of groups of $I_i$ bit planes having each n bits, associated with said sequence of values of $I_i$, and with said sequence of gain factors $gain_i$, and a sign input data set comprising a sequence of sign bits, said input data set being obtainable by the method of claim 1, into an output data set, said output data set comprising a sequence of M coefficients, each coefficient having m bits coding a magnitude and a sign bit, comprising at least one of a logic circuit, an ASIC, a FPGA and a CPU, configured for performing the step of:

for all successive said $I_i$ values,
If $I_i \geq 1$,
  i. computing $GCLI_i = I_i + t - gain_i$;
  ii. copying successive $I_i$ n-bit bit planes from said magnitude data input set to bit planes of index $GCLI_i$ to $t-gain_i+1$ of successive groups of n m-bit words of said output data set;
  iii. for each n m-bit word of said group:
    if said m-bit word has a magnitude different from zero copying a successive sign bit from said sequence of sign bits to the sign bit of said m-bit word;
    if said m-bit word has a magnitude equal to zero copying a zero bit to the sign bit of said m-bit word.
If $I_i = 0$, do nothing.

According to a sixth aspect of the invention, there is provided a method for determining a data budget, required for compressing an input data set comprising a sequence of M coefficients, each coefficient having m bits coding a magnitude and a sign bit, into an output data set comprising a magnitude output data set, a sign output data set and a meta-data output set, in dependence of a quantization level t to be applied to all coefficients of said input data set, said quantization level t going from a maximum value $t_{max}$ to 0, comprising the steps of:

a) grouping the M coefficients into one or more successive groups of n coefficients, n being greater than or equal to 2, each group of coefficients having a sign bit plane and m magnitude bit planes for the different weights of the coefficients;

b) for each group i of coefficients, associating a gain factor $gain_i$, the gain factor $gain_i$ of a group being a left shift of zero to m bits of the coefficients of said group;

c) for each group i of coefficients, determining a value of the Greatest Coded Line Index (GCLI), the GCLI $g_i$ being the index of the highest weight non-zero bit among the bits, excluding any sign bit, of the words in said group, the index being counted from 1 for the least significant bit to m for the most significant bit, the GCLI $g_i$ being zero for a group wherein each of the coefficients are equal to zero;

d) initializing a start table, an end table, a delta table, a budget table, a start' table and a budget' table to zero, said tables having $t_{max}+1$ values;

e) for each successive group i of coefficients, having GCLI $g_i$, if $g_i \neq 0$
  a. add 1 to start[$g_i + gain_i - 1$]
  b. add 1 to end[$gain_i$]
  c. for each coefficient at position j in said group, for j going from 0 to n−1
    if $m_{i,j} \neq 0$, add 1 to start'[$m_{i,j} + gain_i - 1$], wherein $m_{i,j}$ is the index of the highest weight non-zero bit of coefficient j in group i f) for each successive quantization level t from $t_{max}$ down to 0, compute $$\text{delta}[t] := \text{delta}[t+1] + \text{start}[t+1] - \text{end}[t+1] \quad 1)$$

$$\text{budget}[t] := \text{budget}[t+1] + \text{start}[t] + \text{delta}[t] \quad 2)$$

$$\text{budget'}[t] := \text{budget'}[t+1] + \text{start'}[t] \quad 3)$$

said data budget for a quantization level t being the contents of the obtained 4*budget[t]+budget[t'].

Preferably, said $t_{max}$ is equal to m*2.

Preferably, said sequence of M coefficients corresponds to a subband of a wavelet transform of a display image comprising rows and columns of pixels.

Preferably, said sequence of M coefficients corresponds to a sequence of coefficients representing frequency contents of different subbands forming a same spatial area of a display image comprising rows and columns of pixels.

According to a seventh aspect of the invention, there is provided a method for compressing an input data set comprising a sequence of M coefficients, each coefficient having m bits coding a magnitude and a sign bit, into an output data set, said output data set having a data budget of at most R bits, comprising the steps of a) performing a decorrelative transform producing subbands of decorrelated m-bit coefficients;

b) determining a truncation level t such that the data budget required for compressing said input data set is equal to or lower than R, by performing the method of claim 15;

compressing the coefficients of said input data set by performing the method of claim 1, using t as quantization level.

SHORT DESCRIPTION OF THE DRAWINGS

These and further aspects of the invention will be explained in greater detail by way of example and with reference to the accompanying drawings in which:

FIG. 4 compares the peak signal-to-noise ratio (PSNR) for 126 different images for a method without the improvement of the invention and a method according to the invention (with sign packing). FIG. 4 also represents the relative improvement in PSNR and the relative improvement in data budget (rate);

The drawings of the figures are neither drawn to scale nor proportioned. Generally, identical components are denoted by the same reference numerals in the figures.

DETAILED DESCRIPTION OF EMBODIMENTS OF THE INVENTION

Figure 1:
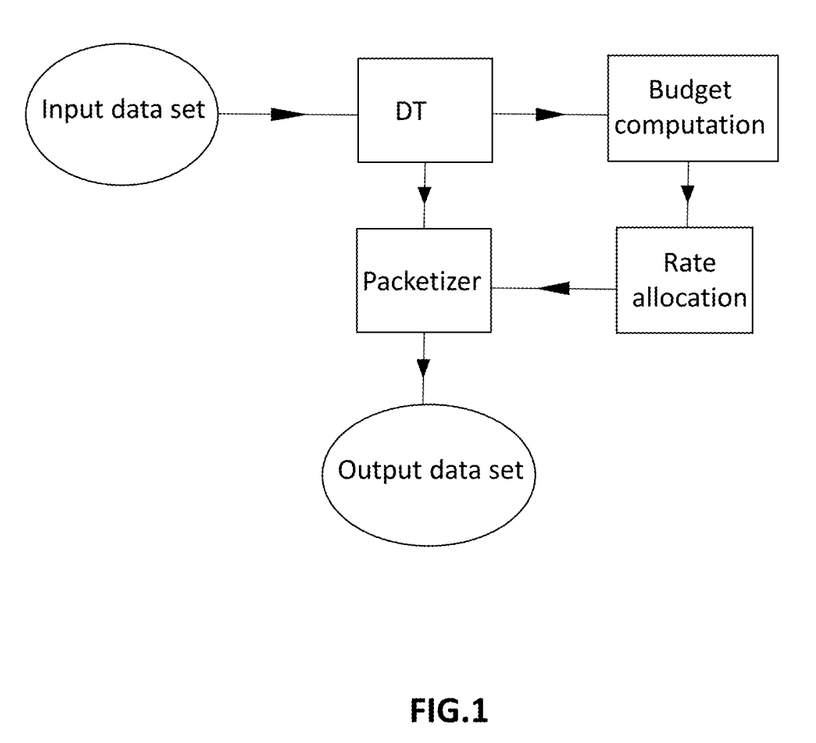
FIG. 1 represents schematically a device for compressing an input data set according to an embodiment of the invention.

FIG. 1 illustrates the main elements of a device for compression according to an embodiment of the invention. Its main purpose is to perform a lossy compression on the input data set so that the output data set contains precisely R bits, R being a data budget constraint. The output data set contains the information required by a decoder to reconstruct data similar to the input data set originally given to the device for compression, the difference between the two being the loss of quality due to the lossy compression. The compression is done with the best effort to minimize this loss of quality under the data budget constraint R. The input data set may be processed by an optional decorrelative transform DT, such as a colour transform and a DWT, which produces decorrelated coefficients coded in sign-magnitude and whose magnitude is between zero and $2^m-1$. The Budget computation unit calculates the cost budget of the output data set in function of a quantization level, and provides this information to the Rate allocation unit. The rate allocation unit, based on the cost budget and the data budget constraint R, calculates a set of quantization levels that optimizes the quality. This operation may be performed once for the whole input data set, or iteratively on subsets of the input data set. Likewise, one quantization level may apply to all the coefficients, or on predefined partitions of those coefficients, for example on subbands of the DWT or precincts grouping contents of different subbands of same spatial area of an image. Those considerations bear no restriction on the invention and thus will not be detailed in this description. The Packetizer formats and assembles the different types of information that are to be stored into the output data set, namely the data, meta-data and headers described below:

- the main data part is obtained by performing a quantization of the coefficients based on the quantization levels calculated by the rate allocation;
- the meta-data are the information, usually of variable and significant size, necessary to the decoder for extracting and reconstructing the data correctly. It includes for instance the number of bits used for encoding the magnitudes;
- the headers contain the main characteristics of the input data and encoding parameters of fixed size. Examples of input data characteristics for an image are the width, height and colour depth. Examples of encoding parameters are the quantization levels, the type of quantifier or DWT. Other headers may be desired to increase the performances, like length fields to allow for splitting the bitstream and processing the different parts in parallel. Headers to make the datastream more robust against errors, like checksums, are also common. The packetizer performs an entropy encoding of the data and the meta-data in order to further reduce their size, thus producing code words which are typically of variable lengths. It then packs them together with the headers to create an output datastream of fixed-sized binary words that better suited for a data bus interface.

In this document, we use "quantization level" to indicate the number of least significant bits (LSB) that are removed from the data binary values. It should be understood that the entropy encoder receives those quantization levels as a directive from the rate allocation to produce the exact desired data budget R, and may use any pre-defined quantization algorithm as long as the required number of LSBs are removed. Indeed, if the quantization were to actually produce another number of bits, the output data budget would not correspond to the budget that the rate allocation computed.

Figure 5:
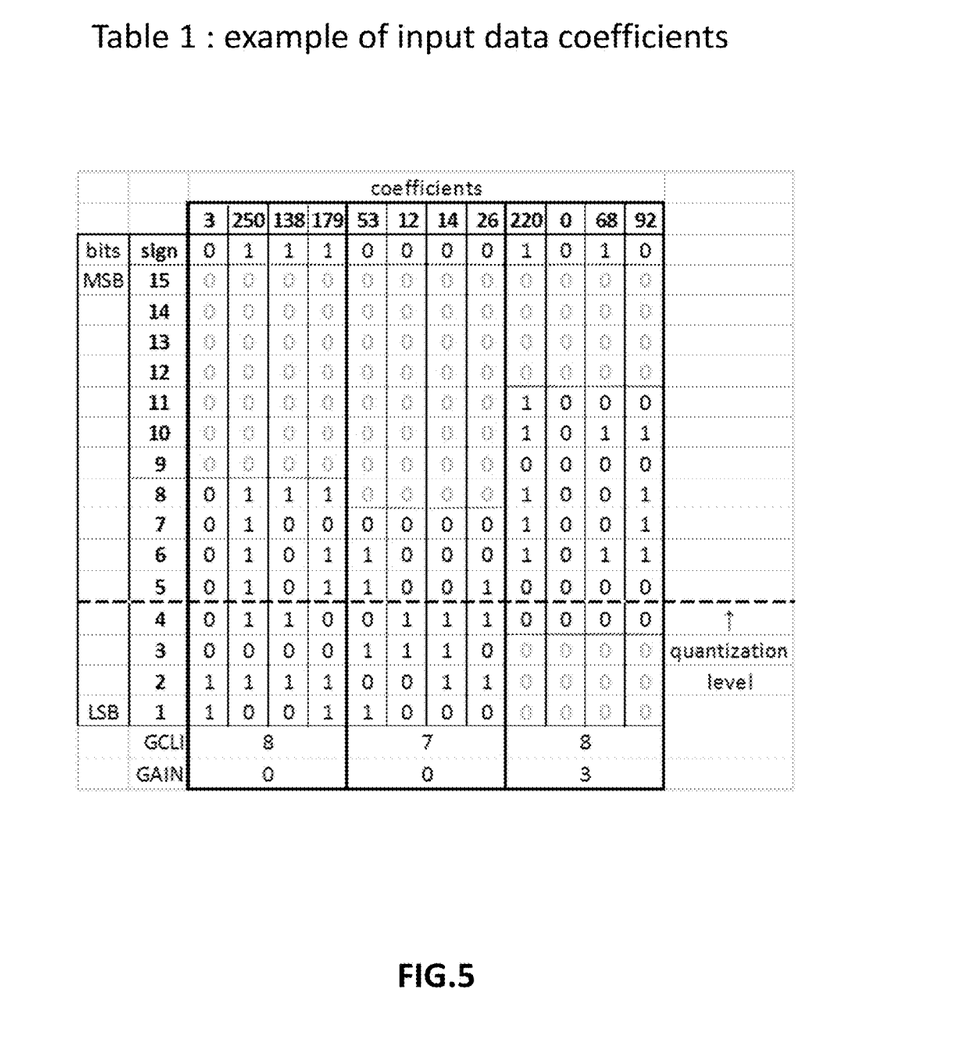
FIG. 5 is Table 1 containing an example of input data coefficients.

In FIG. 5, Table 1 gives an example of 12 coefficients each having a sign bit and 15 bits coding a magnitude, grouped in 3 groups of 4 coefficients. The magnitude of these coefficients are on the top row, in decimal, and their binary coding is shown vertically, from the MSB (top) to the LSB (bottom). The sign is shown in the second row, where "0" stands for "+" and "1" for "−". Each group is associated with a pre-determined and constant gain that virtually shifts the values up before quantization. The net effect of the gain is to lower the quantization for the groups that bring more quality in the image: for instance with a DWT, groups of low-frequency coefficients are given a higher gain since the same level of quantization has a bigger impact on the quality than on high-frequency coefficients. Typically, there is one gain constant per DWT subband. In the example of Table 1, the third group has received a gain of 3, i.e. three zero bit planes have been inserted at the bottom of the table, resulting in the coefficients being multiplied by $2^3$.

For each group of Table 1, the Greatest Coded Line index (GCLI) has been determined, the GCLI being the index of the highest weight non-zero bit among the bits, excluding any sign bit, of the words in said group, the index being counted from 1 for the least significant bit to m for the most significant bit, the GCLI being zero for a group wherein each of the coefficients are equal to zero.

The GCLI indicates the number of bits required for coding a magnitude. In the first group, the three last coefficients have their eight bit equal to 1, all higher bits being zero. Therefore the GCLi for this group is 8. Similarly, the GCLI for the second group is 7 and for the third group is 8.

For each group in table 1, a quantization level of 4 has been selected, represented by the dashed line above the $4^{th}$ bit-plane, and meaning that in the compressed data, the bit planes below the dashed line are removed.

Figure 6:
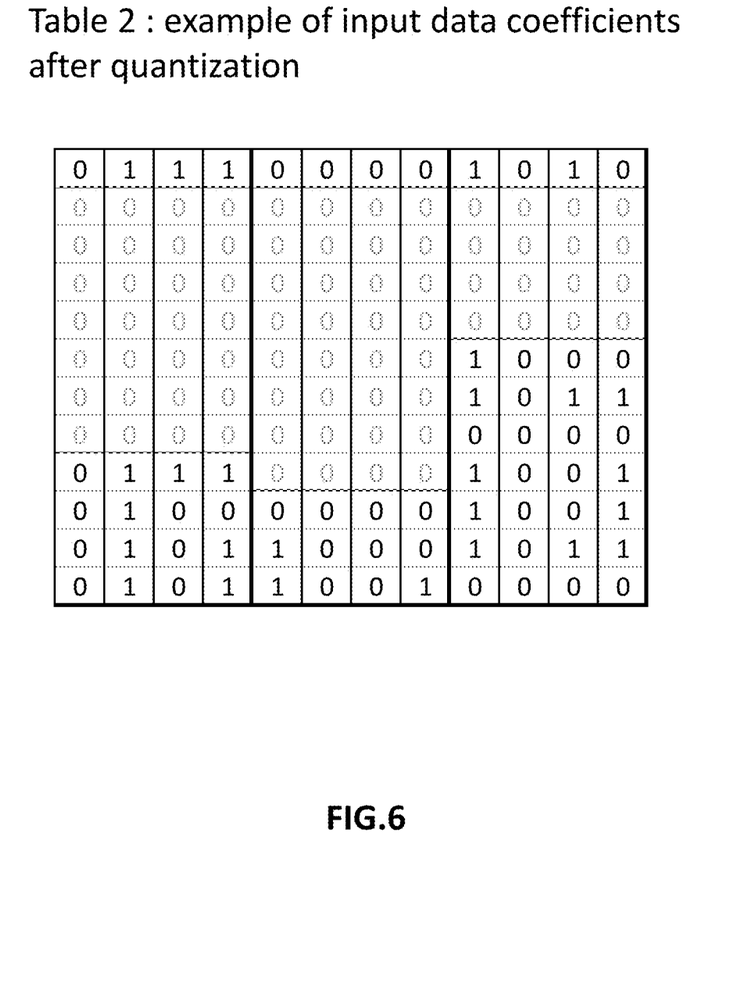
FIG. 6 is Table 2 containing an example of input data coefficients after quantization.

The invention takes advantage of the fact that the coefficients that become null after quantization do not need a sign anymore. As the data budget constraint R gets lower and more demanding in terms of compression, the quantization levels increase to meet this requirement and more coefficients become null. Gaining the data budget occupied by unnecessary signs allows a significant quality improvement in those conditions. Table 2 shows coefficients of Table 1 after quantization, the unnecessary signs being in grey at the top: one in the first group, two in the second and one in the third.

Once unnecessary signs are removed, the decoder can only deduce how many sign bits it must extract from the datastream once their corresponding magnitudes have been unpacked: null values have no sign, non-null values have a sign bit. Therefore it is preferable to separate the packed magnitudes from the packed signs in two distinct segments in the output set, the magnitude output data set and the sign output data set, in order to simplify the process.

Figure 7:
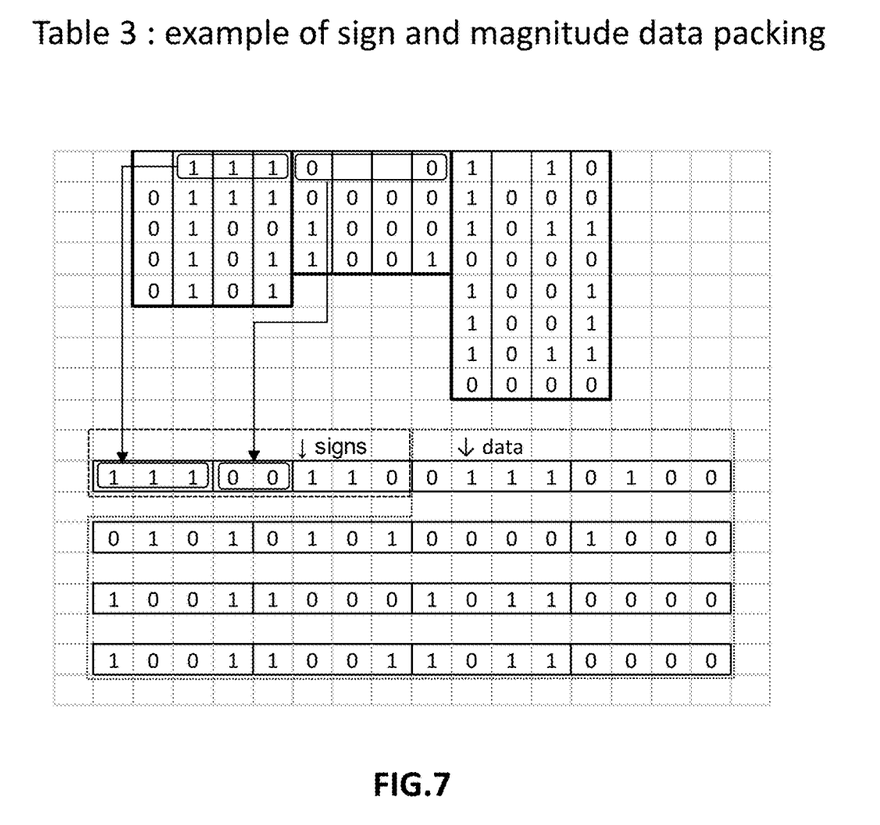
FIG. 7 is Table 3 containing an example of sign and magnitude data packing.

In FIG. 7, Table 3 shows the packing of the significant signs at the beginning of a 32-bit word, and the packing of the magnitudes in three and a half 32-bit words of the output set.

Alternatively, it would be possible to store in the output data set, for each group, the magnitudes then the significant signs. In the previous example, the 16 magnitude bits of the first group would be followed by 3 sign bits. The decoder would still be able, after reading the magnitudes, to calculate how many sign bits it has to extract. However, it would be less efficient to implement in software or hardware, since being able to shift groups of 4 bits is much simpler. Also, separating the signs and the data allows for parallel processing, which would not be possible when mixing signs and magnitudes.

Figure 2:
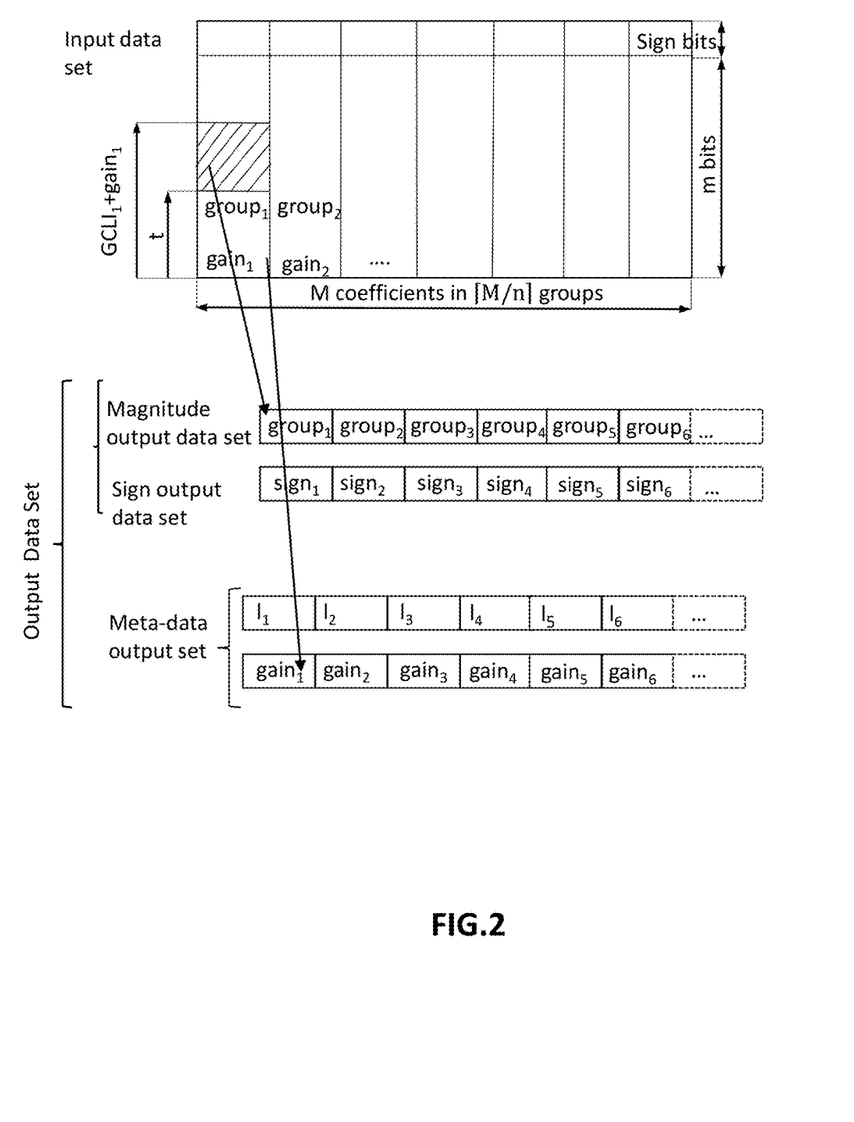
FIG. 2 is a flow-chart representing the operations performed in the method for compressing of the invention.

FIG. 2 is a flow-chart representing the operations performed in the method for compressing of the invention. The input data set comprises a set of M coefficients, each having m magnitude bits and a sign bit. The M coefficients are grouped in groups having n coefficients each. If M is not a multiple of n, any incomplete group may be padded with zeros. The ⌈ and ⌉ signs represent the "ceiling function" i.e. the smallest integer greater than or equal to its argument. A gain may be given to each group. A same quantization level t is applied to all coefficients of the input data set. For each group, the bit planes, starting from the (GCLI+gain)$^{th}$ down to the (t+1)$^{th}$ bit plane, i.e. $I_i$ bit planes, are copied to the magnitude output data set, and the sign bits of the non-zero resulting coefficients are copied to the sign output data set. The hatched area of FIG. 2 contains the bit planes of the coefficients of the first group that are copied to the magnitude output data set. For each group, the value of $I_i$ are copied to the meta-data output set. Alternatively, the values of the GCLI may be copied to the meta-data output set. If gains are applied, the values of the gains are copied to the meta-data output set. FIG. 2 also represents the compressed data set of the invention, being the output data set on the flow chart. The compressed data set may store images or video on a permanent support or be the subject of transmission on a video channel. Depending on the needs of the application, the quantization level t may be coded in the output data set.

Figure 3:
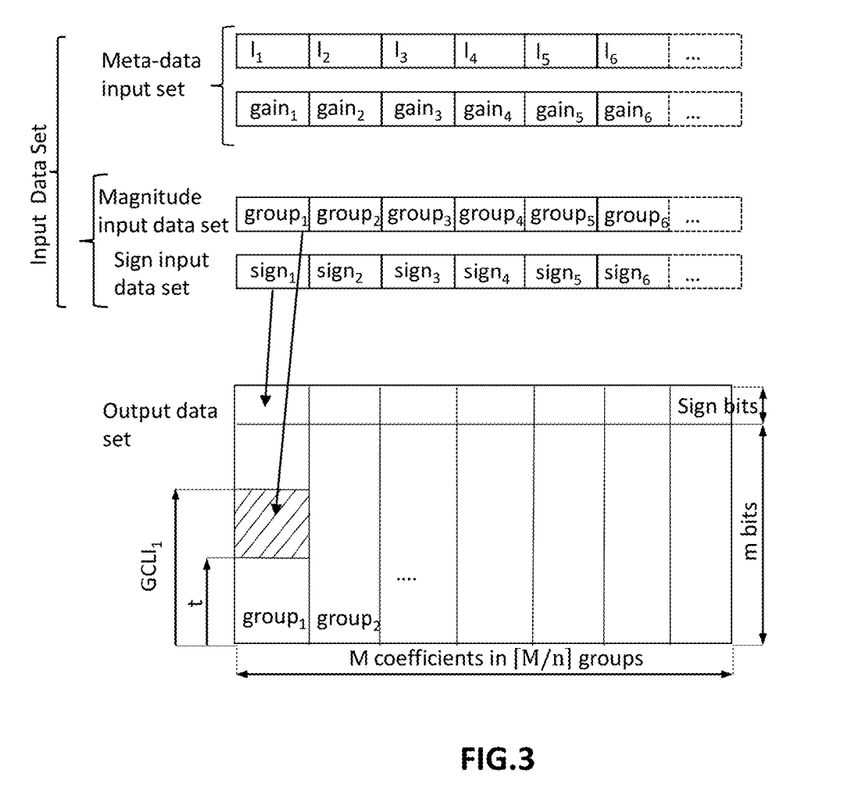
FIG. 3 is a flow-chart representing the operations performed in the method for decompressing of the invention.

FIG. 3 is a flow-chart representing the operations performed in the method for decompressing of the invention. A data store for storing M coefficients, each having a sign bit and m magnitude bits is initialized to zero. The quantization level t is either received as part of the header of the input data set, or known beforehand for the type of data being processed. The bits planes of the first group of the magnitude data input set is copied to the bit planes GCLI to t−gain+1 of the first group in the data store. The hatched area of FIG. 3 contains the bit planes of the coefficients of the first group that are copied to the output data set. For each coefficient in the group, if its magnitude is different from zero, a sign bit is retrieved from the sign data input set and stores in the corresponding sign bit of this coefficient. If the magnitude is zero, no sign bit is retrieved. This process is repeated for all groups of coefficients in the input data set.

The Budget computation unit takes the GCLIs as input and calculates the output data set size used by each group depending on its quantization level $t_i$ and its gain gain$_i$. Note that these values need not be different in each group. Usually the gains and quantization levels are unique for all the coefficients belonging to the same DWT subband, when such a decorrelative algorithm is used. The quantization takes the gain into account by removing $t_i'$=max($t_i$−gain$_i$,0) LSBs instead of $t_i$ bits. This requires the data budget unit to provide the data budget in function of the effective quantization level $t_i'$ for the whole data set being compressed, which could be one subband, one or several lines, a precinct, being a sequence of coefficients grouping frequency contents of different subbands forming a same spatial area of a display image comprising rows and columns of pixels, depending on the application. It is usually interesting to use the same quantization level for a large number of data, since those quantization coefficients have to be provided in the data set for the decoder. From this point on the term "precinct" will be used to represent such a data set sharing a common quantization level.

Figure 8:
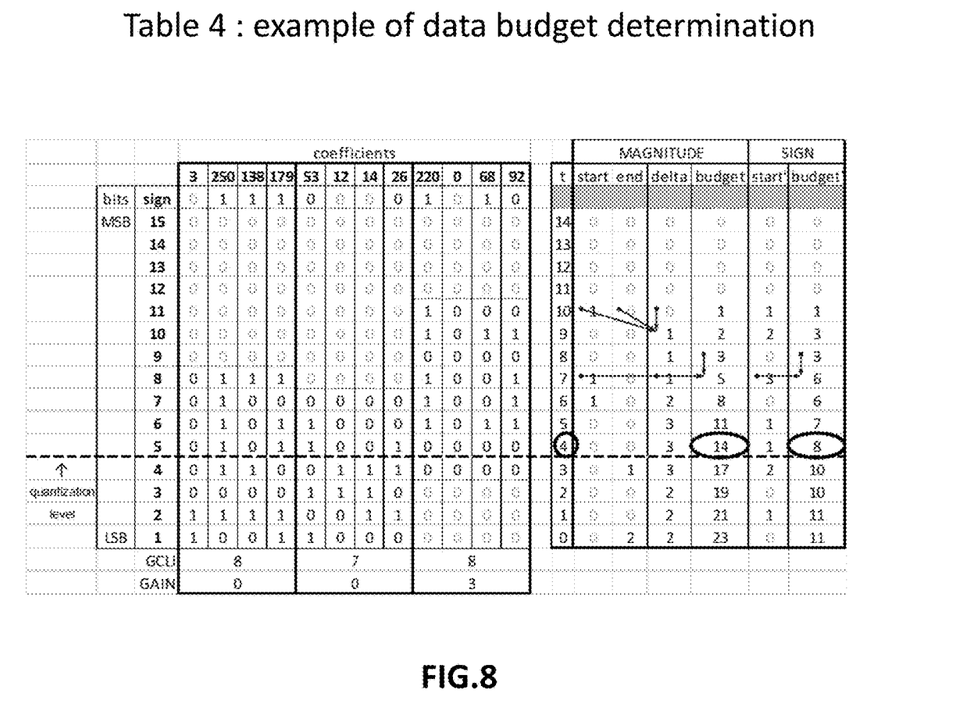
FIG. 8 is Table 4 containing an example of data budget determination.

In FIG. 8, Table 4 illustrates how the data budget in nibbles is calculated for a set of M coefficients in function of a quantization level. In this example there are three GCLIs, two {8, 7} in one subband of gain 0, and one {8} in a second subband of gain 3. The start table counts at each index the number of groups having their MSB at that bit index (taking the gain into account), the end table counts at each index the number of groups having their LSB at that bit index.

The start/end tables are initialized to zero before processing each precinct, then updated by processing the GCLIs on the fly:

A second start' table is required to count at which quantization level each sign must be included in the datastream. The start/end and start'/end' tables are initialized to zero before processing each subset, then calculated from the GCLIs on the fly:

For Each GCLI $g_i$:

$$g_i \rightarrow \text{if } g_i \neq 0 : \begin{cases} \text{start}[g_i + \text{gain}_i - 1]++ \\ \text{end}[\text{gain}_i]++ \end{cases}$$

$$g_i \rightarrow \text{for } j \text{ in } 0 \text{ to } n_g - 1: \text{start}'[m_{i,j} + \text{gain}_i - 1]++$$

in which $m_{i,j}$ is the MSB index of the coefficient at position j in this GCLI (j=0 ... n−1), When all the GCLIs of the precinct have been processed, the delta and budget tables are built, from the highest level of quantization $t_{max}$ to the lowest (again, the dual is possible):

Initialization:

delta[$t_{max}$+1]:=0,budget[$t_{max}$+1]:=0,budget'[$t_{max}$+1]:=0     (d.4)

For t in $t_{max}$ Down to 0:

delta[t]:=delta[t+1]+start[t+1]−end[t+1]

budget[t]:=budget[t+1]+start[t]+delta[t]

budget'[t]:=budget'[t+1]+start'[t]

The cost budget, for a level of quantization t, in bits, is 4*budget[t]+budget'[t]. For example in table 4, if quantization level=4, cost=4*14+8=64 bits.

The Rate allocation calculates the quantization levels applied to the precincts so that the output data budget equals R. An efficient method of rate allocation comprises two steps: calculation of the precinct budget constraints, and calculation of the quantization level to be applied to each precinct.

The first step calculates, for each precinct and from the data budget requirement R on the whole datastream, the precinct data budget requirement $R_p$. A simple and efficient way to calculate $R_p$ is to divide the data budget equally between the $n_p$ precincts:

$R_p = \lfloor R/n_p \rfloor$

Where the ⌊ and ⌋ signs represent the "floor function", i.e. the integer part of its argument. The second step calculates the lowest quantization level such that the output data budget of each precinct is less than or equal to $R_p$. This is achieved by iterating on the precinct quantization level $t_p$, by using the budget table of the precinct and stopping on the lowest value of $t_p$ such that:

$$budget[t_p] \leq R_p$$

In the case of remainder, when $n_p \cdot R_p < R$ or $budget[t_p] < R_p$, the difference between the required and achieved rate may be compensated by additional padding.

Figure 4:
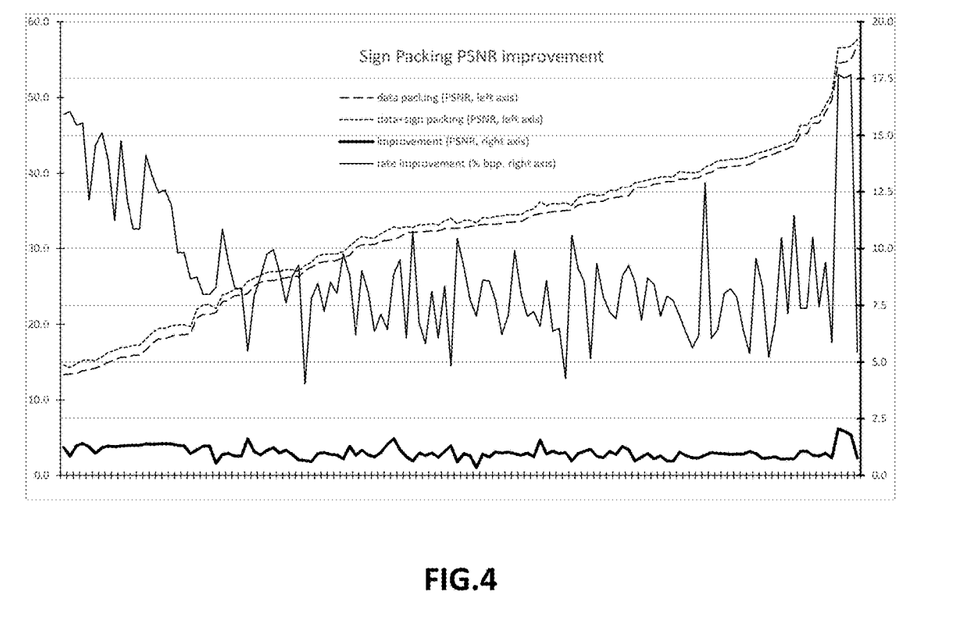

FIG. 4 shows the improvement in peak signal-to-noise ratio (PSNR) and data budget over 126 different images and compression ratios. The encoder is using a constant data budget constraint, which means it will output exactly the number of bits specified by the data budget constraint, not more, not fewer. The dashed curves are the absolute PSNR of the image after/before the processing done by the codec (compression then decompression), they have been sorted by increasing level of quality.

The plain curve at the bottom is the difference between PSNR with sign packing and the PSNR without sign packing (scale on the right axis), the improvement in PSNR is about constant on the whole range, which means that it has more relative impact on images with a lower PSNR, in other words the images that most need improving.

The other plain curve shows how much data budget could be saved thanks to the sign packing (in percent of the bits-per-pixel rate, on the right axis). For higher compression rates, on the left of the graph, about 10 to 15 percent of the data budget were saved by removing unnecessary signs and could be used to include more actual data since a fixed data budget is used, hence improving the output quality.

The present invention has been described in terms of specific embodiments, which are illustrative of the invention and not to be construed as limiting. More generally, it will be appreciated by persons skilled in the art that the present invention is not limited by what has been particularly shown and/or described hereinabove.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

The invention may also be described as follows: the invention provides a method and device for compressing a display stream wherein coefficients are grouped, for each group, the greatest coded line index (GCLI) is determined and only the GCLI lowest weight bits of the coefficients are copied into the output stream together with the value of the GCLI. Sign bits of coefficients having a zero truncated value are not copied to the output stream. The invention provides good compression efficiency together with a simple hardware.

The invention claimed is:

1. A method for compressing an input data set comprising a sequence of M coefficients, each coefficient having m bits coding a magnitude and a sign bit, into an output data set comprising a magnitude output data set, a sign output data set and a meta-data output data set, comprising the steps of:
   a) grouping the resulting decorrelated coefficients into one or more successive groups of n coefficients, n being greater than or equal to 2, each group of coefficients having a sign bit plane and m magnitude bit planes for the different weights of the coefficients;
   b) for each group i of coefficients, associating a gain factor $gain_i$, the gain factor $gain_i$ of a group being a left shift of zero to m bits of the coefficients of said group;
   c) for each group i of coefficients, determining a value of the Greatest Coded Line Index (GCLI), the $GCLI_i$ being the index of the highest weight non-zero bit among the bits, excluding any sign bit, of the words in said group i, the index being counted from 1 for the least significant bit to m for the most significant bit, the GCLI being zero for a group wherein all of the coefficients are equal to zero;
   d) determining a quantization level t, a quantization level t being the number of least significant bits that may be removed from each of said coefficients of said input data set;
   e) for each group i of coefficients:
      for each coefficient in said group
         applying a left-shift of $gain_i$ bits and a right shift of t bits to said coefficient;
         if the resulting value is smaller than 1, doing nothing;
         if the resulting value is greater than or equal to 1, copying the sign bit of said coefficient to the sign output data set;
   f) for each group i of coefficients:
      if $GCLI_i + gain_i \geq t+1$, for each bit plane of said group, starting from the bit plane having index $GCLI_i + gain_i$, to the bit plane having index t+1, copy said bit plane to the magnitude output data set;
      if $GCLI_i + gain_i < t+1$, doing nothing;
   g) for each group i of coefficients, determining the number of bit planes copied, $I_i$, being equal to $\max(GCLI_i + gain_i - t, 0)$, and copying the value of $I_i$ to said meta-data output set;
   h) for each group i of coefficients, providing data representing said gain $gain_i$ to said meta-data output set;
   i) providing data representing said quantization level t to said output data set.

2. The method according to claim 1, wherein said input data set is obtained by performing a decorrelative transform on a non-decorrelated input data set.

3. The method according to claim 2, wherein said de-correlative transform is a DWT 5/3 wavelet transform based on a filter bank.

4. The method according to claim 2, wherein said sequence of M coefficients corresponds to a sequence of pixels in one or more rows of a display image comprising rows and columns of pixels and that said de-correlative transform is performed on said sequence of pixels in one or more rows.

5. The method according to claim 2, wherein said sequence of M coefficients corresponds to a sequence of coefficients grouping frequency contents of different sub-bands forming a same spatial area of a display image comprising rows and columns of pixels.

6. The method according to claim 1, wherein n is smaller than or equal to 8.

7. The method according to claim 6, wherein n is equal to 4.

8. The method according to claim 1 wherein said step (g) comprises the step of replacing the $I_i$'s by an entropic coding thereof.

9. The method according claim 8 wherein said entropic coding is a unary coding.

10. A method for decompressing an input data set comprising a meta-data input set comprising a sequence of values of $I_i$ being a number of bit planes and data representing a sequence of gain factors $gain_i$ and a magnitude input data set comprising a sequence of groups of $I_i$ bit planes having each n bits, associated with said sequence of values of $I_i$, and with said sequence of gain factors $gain_i$, and a sign input data set comprising a sequence of sign bits, said input data set being obtainable by the method of claim 1, into an output data set, said output data set comprising a sequence of M coefficients, each coefficient having m bits coding a magnitude and a sign bit, comprising the step of:

for all successive said $I_i$ values,
If $I_i \geq 1$,
 i. computing $GCLI_i = I_i + t - gain_i$;
 ii. copying successive $I_i$ n-bit bit planes from said magnitude data input set to bit planes of index $GCLI_i$ to $t - gain_i + 1$ of successive groups of n m-bit words of said output data set;
 iii. for each n m-bit word of said group:
  if said m-bit word has a magnitude different from zero copying a successive sign bit from said sequence of sign bits to the sign bit of said m-bit word;
  if said m-bit word has a magnitude equal to zero copying a zero bit to the sign bit of said m-bit word;
If $I_i = 0$, do nothing.

11. A compressed data set corresponding to an uncompressed data set, said uncompressed data set comprising a sequence of M coefficients, each coefficient having m bits coding a magnitude and a sign bit, said compressed data set comprising a data set comprising a magnitude data set comprising a sequence of magnitude data, each magnitude data comprising a number $I_i$ of bit planes, each bit plane having n bits, and a sign data set comprising a sequence of sign bits; and a meta-data set comprising a sequence of values of $I_i$ and data representing a sequence of gain factors $gain_i$, said two sequences being associated with said sequence of magnitude data, obtainable by the method of claim 1.

12. The compressed data set according to claim 11 corresponding to an uncompressed data set, said uncompressed data set representing a display image comprising rows and columns of pixels.

13. A device for compressing an input data set comprising a sequence of M coefficients, each coefficient having m bits coding a magnitude and a sign bit, into an output data set comprising a magnitude output data set, a sign output data set and a meta-data output data set, comprising at least one of a logic circuit, an ASIC, a FPGA and a CPU, configured for performing the steps of:

a) grouping the resulting decorrelated coefficients into one or more successive groups of n coefficients, n being greater than or equal to 2, each group of coefficients having a sign bit plane and m magnitude bit planes for the different weights of the coefficients;

b) for each group i of coefficients, associating a gain factor $gain_i$, the gain factor $gain_i$ of a group being a left shift of zero to m bits of the coefficients of said group;

c) for each group i of coefficients, determining a value of the Greatest Coded Line Index (GCLI), the $GCLI_i$ being the index of the highest weight non-zero bit among the bits, excluding any sign bit, of the words in said group i, the index being counted from 1 for the least significant bit to m for the most significant bit, the GCLI being zero for a group wherein all of the coefficients are equal to zero;

d) determining a quantization level t, a quantization level t being the number of least significant bits that may be removed from each of said coefficients of said input data set;

e) for each group i of coefficients:
for each coefficient in said group
 applying a left-shift of $gain_i$ bits and a right shift of t bits to said coefficient;
 if the resulting value is smaller than 1, doing nothing;
 if the resulting value is greater than or equal to 1, copying the sign bit of said coefficient to the sign output data set;

f) for each group i of coefficients:
if $GCLI_i + gain_i \geq t + 1$, for each bit plane of said group, starting from the bit plane having index $GCLI_i + gain_i$, to the bit plane having index $t + 1$, copy said bit plane to the magnitude output data set;
if $GCLI_i + gain_i < t + 1$, doing nothing;

g) for each group i of coefficients, determining the number of bit planes copied, $I_i$, being equal to $\max(GCLI_i + gain_i - t, 0)$, and copying the value of $I_i$ to said meta-data output set;

h) for each group i of coefficients, providing data representing said gain $gain_i$ to said meta-data output set;

i) providing data representing said quantization level t to said output data set.

14. A device for decompressing an input data set comprising a meta-data input set comprising a sequence of values of $I_i$ being a number of bit planes and data representing a sequence of gain factors $gain_i$ and a magnitude input data set comprising a sequence of groups of $I_i$ bit planes having each n bits, associated with said sequence of values of $I_i$, and with said sequence of gain factors $gain_i$, and a sign input data set comprising a sequence of sign bits, said input data set being obtainable by the method of claim 1, into an output data set, said output data set comprising a sequence of M coefficients, each coefficient having m bits coding a magnitude and a sign bit, comprising at least one of a logic circuit, an ASIC, a FPGA and a CPU, configured for performing the step of:

for all successive said $I_i$ values,
If $I_i \geq 1$,
 i. computing $GCLI_i = I_i + t - gain_i$;
 ii. copying successive $I_i$ n-bit bit planes from said magnitude data input set to bit planes of index $GCLI_i$ to $t - gain_i + 1$ of successive groups of n m-bit words of said output data set;
 iii. for each n m-bit word of said group:
  if said m-bit word has a magnitude different from zero copying a successive sign bit from said sequence of sign bits to the sign bit of said m-bit word;
  if said m-bit word has a magnitude equal to zero copying a zero bit to the sign bit of said m-bit word
If $I_i = 0$, do nothing.

15. A method for determining a data budget, required for compressing an input data set comprising a sequence of M coefficients, each coefficient having m bits coding a magnitude and a sign bit, into an output data set comprising a magnitude output data set, a sign output data set and a meta-data output data set, in dependence of a quantization level t to be applied to all coefficients of said input data set, said quantization level t going from a maximum value $t_{max}$ to 0, comprising the steps of:
  a) grouping the M coefficients into one or more successive groups of n coefficients, n being greater than or equal to 2, each group of coefficients having a sign bit plane and m magnitude bit planes for the different weights of the coefficients;
  b) for each group i of coefficients, associating a gain factor $gain_i$, the gain factor $gain_i$ of a group being a left shift of zero to m bits of the coefficients of said group;
  c) for each group i of coefficients, determining a value of the Greatest Coded Line Index (GCLI), the GCLI $g_i$ being the index of the highest weight non-zero bit among the bits, excluding any sign bit, of the words in said group, the index being counted from 1 for the least significant bit to m for the most significant bit, the GCLI $g_i$ being zero for a group wherein each of the coefficients are equal to zero;
  d) initializing a start table, an end table, a delta table, a budget table, a start' table and a budget' table to zero, said tables having $t_{max}+1$ values;
  e) for each successive group i of coefficients, having GCLI $g_i$, if $g_i \neq 0$
    a. add 1 to start[$g_i$+$gain_i$−1]
    b. add 1 to end[$gain_i$]
    c. for each coefficient at position j in said group, for j going from 0 to n−1
      if $m_{i,j} \neq 0$, add 1 to start'[$m_{i,j}$+$gain_i$−1], wherein $m_{i,j}$ is the index of the highest weight non-zero bit of coefficient j in group i
  f) for each successive quantization level t from $t_{max}$ down to 0, compute $$\text{delta}[t] := \text{delta}[t+1] + \text{start}[t+1] - \text{end}[t+1] \qquad 4)$$

$$\text{budget}[t] := \text{budget}[t+1] + \text{start}[t] + \text{delta}[t] \qquad 5)$$

$$\text{budget}'[t] := \text{budget}'[t+1] + \text{start}'[t] \qquad 6)$$

said data budget for a quantization level t being the contents of the obtained 4*budget[t]+budget[t'].

16. The method according to claim 15, wherein $t_{max}$ is equal to m*2.

17. The method according to claim 15, wherein said sequence of M coefficients corresponds to a subband of a wavelet transform of a display image comprising rows and columns of pixels.

18. The method according to claim 15, wherein said sequence of M coefficients corresponds to a sequence of coefficients representing frequency contents of different subbands forming a same spatial area of a display image comprising rows and columns of pixels.

19. A method for compressing an input data set comprising a sequence of M coefficients, each coefficient having m bits coding a magnitude and a sign bit, into an output data set, said output data set having a data budget of at most R bits, comprising the steps of
  a) performing a decorrelative transform producing subbands of decorrelated m-bit coefficients;
  b) determining a truncation level t such that the data budget required for compressing said input data set is equal to or lower than R, by performing the method of claim 15;
  c) compressing the coefficients of said input data set by performing the method of claim 1, using t as quantization level.

\* \* \* \* \*